March 29, 1966     A. C. SULESKI     3,243,765
COMBINATION GALVANIC VELOCITY CELL AND HYDROPHONE
Filed Dec. 9, 1963
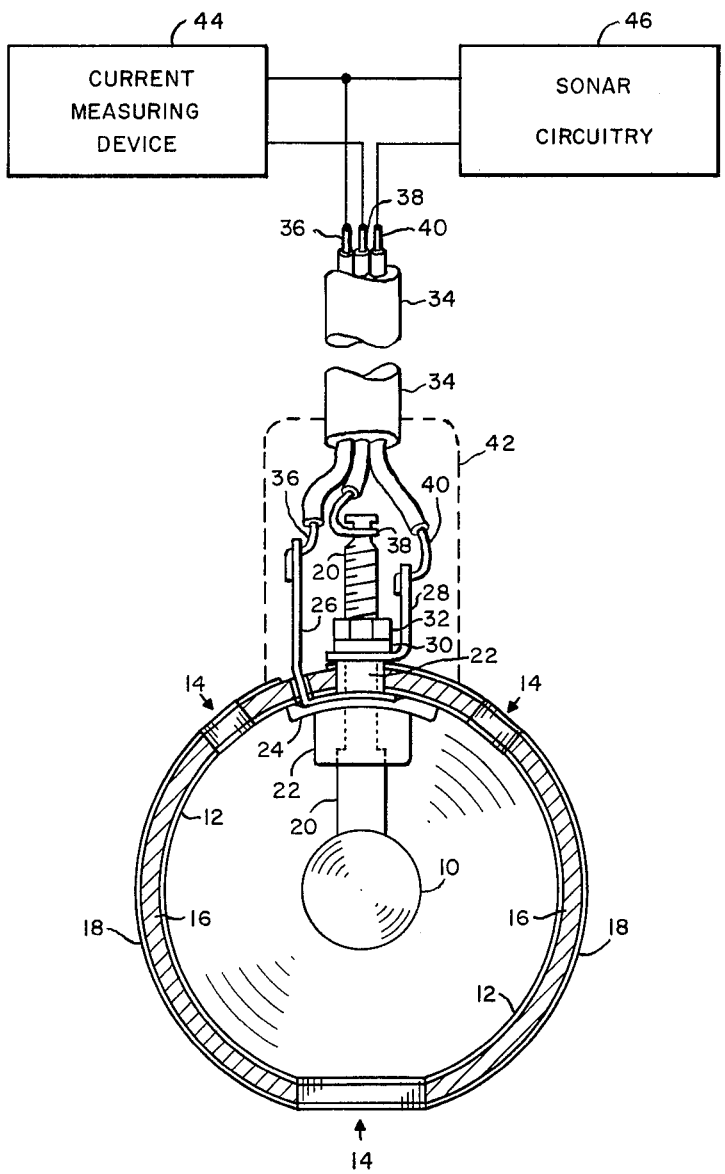

United States Patent Office 3,243,765
Patented Mar. 29, 1966

3,243,765
COMBINATION GALVANIC VELOCITY CELL AND HYDROPHONE
Anthony C. Suleski, Centerport, N.Y., assignor to Hazeltine Research Inc., a corporation of Illinois
Filed Dec. 9, 1963, Ser. No. 329,039
9 Claims. (Cl. 340—5)

The present invention relates to apparatus for providing the combined functions of a galvanic velocity cell and a hydrophone. More particularly, the invention provides apparatus permitting the monitoring of, and accurate analysis of, sound occurring in a body of liquid such as the ocean and may be used in sonar systems.

Devices are available which may be suspended below the surface of the ocean and arranged to provide an electrical signal representative of sound vibrations occurring in the vicinity of the device. Such signals are useful in sonar systems. However, it is well known that the propagation of sound in sea water is affected by the salinity, temperature and other characteristics of the water, so that information representative of the velocity of sound in the water is required in order to permit accurate analysis of sound vibrations to be performed in a sonar system.

One form of Apparatus for Determining the Velocity of Sound in a Liquid is described in detail in a patent application of that tile of the present inventor, filed February 6, 1963, Serial No. 256,577. Many types of transducer devices for monitoring sound vibrations in liquids are known.

Objects of the present invention are to provide new and improved apparatus for providing both a signal representative of the velocity of sound in a liquid and also a signal representative of vibrations occuring in said liquid and in particular to provide such apparatus which is compact, inexpensive to manufacture and reliable in operation.

For a better understanding of the present invention, together with other and further objects thereof, reference is had to the following description taken in connection with the accompanying drawing, and its scope will be pointed out in the appended claims.

The drawing shows one form of apparatus constructed in accordance with the invention. In the drawing certain dimensions have been distorted for purposes of clarity.

Referring now to the drawing there is shown one example of a combination galvanic velocity cell and hydrophone apparatus constructed in accordance with the invention for providing a first electrical signal representative of the velocity of sound in a liquid and a second signal representative of vibrations occurring in the liquid.

As shown, the apparatus includes a galvanic cell comprising a first electrode in the form of a zinc sphere 10 and a second surrounding electrode in the form of a substantially spherical shell 12 having three openings all labeled 14 which provide access to the internally positioned first electrode 10. In the embodiment shown, second electrode 12 is a thin shell of gold, a metal which is more noble than the zinc of the first electrode 10. It will be appreciated that a liquid must be provided between electrodes 10 and 12 in order to have a functioning galvanic cell, however, for present purposes the combination of the two spaced electrodes 10 and 12 will be termed a galvanic cell.

The illustrated apparatus also includes a transducer comprising a quantity of transducer material, shown as a spherical shell 16 constructed of barium titanate, coupled between the second electrode 12 and a third electrode 18. As shown, third electrode 18 is a thin shell preferably composed of the same metal as the second electrode, which in this example is gold. In the drawing the front hemispheres of shell 16 and electrodes 12 and 18 have been removed to expose the interior components. Specific materials have been recited in discussing the illustrated embodiment, but it will be clear that other materials may be used; for example, lead zirconate or mixtures of barium titanate and lead zirconate may be used as the transducer material and different metals may be used.

The details of construction of the apparatus of the drawing may be as follows. A spherical shell 16 of transducer material is provided with circular holes 14, one at the bottom and two more near the top and with another hole directly at the top. Two unconnected metallic layers are formed on the interior and exterior surfaces of shell 16 to form electrodes 12 and 18, respectively. Solid spherical electrode 10 is supported by a member 20 which has its upper threaded end inserted through the upper-most hole in shell 16. Carried on member 20 is an insulative sleeve 22. Sleeve 22 in turn carries a deformable washer 24, a first metallic lug 26 which contacts the interior electrode 12, a second metallic lug 28 which contacts the exterior electrode 18, and an insulative washer 30. A nut 32 which rides on the upper threaded portion of member 20 is tightened to provide structural stability. Lug 26 protrudes through a small hole in shell 16 and is arranged to prevent contact with exterior electrode 18. A three-conductor cable 34 has conductor 36 connected to lug 26, conductor 38 connected to the top of member 20 and conductor 40 connected to lug 28. The area of these connections is enclosed by a quantity of a suitable potting compound 42 to provide a water-tight seal. These construction details are only for purposes of example and many variations of construction are possible.

The illustrated embodiment of the invention also includes a current-measuring device 44 coupled to the first electrode 10 and the second electrode 12 and sonar circuitry 46 coupled to second electrode 12 and third electrode 18. Current-measuring device 44 may be an ammeter having one or more scales calibrated to read in units of velocity. Sonor circuitry 46 comprises means for processing signals so as to permit analysis of sound vibrations and may take the form of equipment used in prior art sonar systems.

In operation, the illustrated apparatus functions as follows. The structure appearing below the break in cable 34 is suspended below the surface of a body of liquid, such as the ocean. The combination of electrodes 12 and 18 and transducer material 16 functions in the manner of a prior art transducer to produce an electrical output signal representative of vibrations occurring in the liquid. Such vibrations may represent signals produced by a controlled source which reach the present apparatus after reflection from underwater objects. This electrical signal is coupled to sonar circuitry 46 via conductors 36 and 40 and processed in the manner of the prior art to develop information regarding underwater vibrations. As already mentioned, accurate analysis of such vibrations is dependent on a knowledge of the velocity of sound in the body of liquid which is involved.

When immersed, the liquid which enters the space between electrode 10 and surrounding electrode 12 produces a functioning galvanic cell. Electro-chemical corrosion begins, corroding away the less noble metal (zinc electrode 10 in the example discussed) and producing an electric current. As described in greater detail in the applicant's previously referenced patent application, applicant has discovered that the characteristics of a liquid (i.e. temperature, salinity, etc.) which determine the magnitude of the corrosion current produced by such a cell, are also the important characteristics in determining the speed of sound in that liquid. Therefore, by coupling current-measuring device 44 to the galvanic cell, via conductors 36 and 38, and measuring the galvanic current produced, a measure of the velocity of sound in the liquid is obtained. The galvanic current can be determined in amperes and then compared to a previously prepared calibration chart to determine the velocity of sound represented by that current, or the scale of an ammeter can be calibrated to read directly in velocity enabling velocity to be read directly. In either case, calibration can be carried out in accordance with established methods of calibrating ammeters and other types of scientific equipment. In operation, the present apparatus provides a continuous monitoring of the velocity of sound in the liquid involved.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Apparatus for providing a first electrical signal representative of the velocity of sound in a liquid and a second electrical signal representative of vibrations occurring in said liquid comprising:
    a galvanic cell comprising first and second electrodes;
    a transducer comprising a quantity of transducer material coupled between said second electrode and a third electrode for producing an electrical signal in response to mechanical vibrations;
    the apparatus being so constructed and arranged that when immersed in a liquid said first signal is made available by coupling to said first and second electrodes and said second signal is made available by coupling to said second and third electrodes.

2. Apparatus in accordance with claim 1, additionally comprising:
    a current measuring device coupled to said first and second electrodes and calibrated to indicate the velocity of sound in said liquid;
    and means coupled to said second and third electrodes for processing said second signal so as to permit analysis of sound vibrations occurring in said liquid.

3. Apparatus for providing a first electrical signal representative of the velocity of sound in a liquid and a second electrical signal representative of vibrations occurring in said liquid comprising:
    a galvanic cell comprising a first electrode of a first metal and a second electrode of a more-noble metal spaced from said first electrode;
    a transducer comprising a quantity of transducer material coupled between said second electrode and a third electrode of the same metal as said second electrode, for producing an electrical signal in response to mechanical vibrations;
    the apparatus being so constructed and arranged that when immersed in a liquid said first signal is made available by coupling to said first and second electrodes and said second signal is made available by coupling to said second and third electrodes.

4. Apparatus in accordance with claim 3 additionally comprising:
    a current measuring device coupled to said first and second electrodes and calibrated to indicate the velocity of sound in said liquid;
    and means coupled to said second and third electrodes for processing said second signal so as to permit analysis of sound vibrations occurring in said liquid.

5. Apparatus in accordance with claim 3 wherein said liquid is sea water, said first metal is zinc, said more-noble metal is gold and said transducer material is barium titanate.

6. A combination galvanic velocity cell and hydrophone for providing a first electrical signal representative of the velocity of sound in a liquid and a second electrical signal representative of sound vibrations occurring in said liquid comprising:
    a galvanic cell comprising a first substantially spherical electrode of a first metal and a second surrounding electrode of a more-noble metal in the form of a substantially spherical shell having at least one opening providing access to the internally positioned first electrode;
    a transducer, comprising a quantity of transducer material coupled between the external surface of said second electrode and the internal surface of a third electrode of the same metal as said second electrode, for producing an electrical signal in response to sound vibrations;
    the apparatus being so constructed and arranged that when immersed in a liquid said first signal is made available by coupling to said first and second electrodes and said second signal is made available by coupling to said second and third electrodes.

7. Apparatus in accordance with claim 6 wherein said liquid is sea water, said first metal is zinc, said more-noble metal is gold and said transducer material is barium titanate.

8. Apparatus in accordance with claim 6 additionally comprising:
    a current measuring device coupled to said first and second electrodes and calibrated to indicate the velocity of sound in said liquid;
    and means coupled to said second and third electrodes for processing said second signal so as to permit analysis of sound vibrations occurring in said liquid.

9. Apparatus in accordance with claim 8 wherein said liquid is sea water, said first metal is zinc, said more-noble metal is gold and said transducer material is barium titanate.

No references cited.

CHESTER L. JUSTUS, *Primary Examiner.*

R. A. FARLEY, *Assistant Examiner.*